(12) United States Patent
Fronius et al.

(10) Patent No.: US 9,149,899 B2
(45) Date of Patent: Oct. 6, 2015

(54) MACHINING CENTER HAVING ROTARY TRANSMITTER FOR ELECTRIC ENERGY

(75) Inventors: Juergen Fronius, Walheim/Neckar (DE); Wolfgang Bierl, Gueglingen (DE); Heiko Graf, Gerlingen (DE); Ewald Hasselkuss, Fellbach (DE); Roland Hoerl, Boennigheim (DE); Gerhard Stolz, Ingersheim (DE)

(73) Assignee: KOMET GROUP GMBH, Besigheim (DE)

( * ) Notice: Subject to any disclaimer, the term of this patent is extended or adjusted under 35 U.S.C. 154(b) by 1129 days.

(21) Appl. No.: 12/737,378

(22) PCT Filed: Sep. 24, 2009

(86) PCT No.: PCT/EP2009/062350
§ 371 (c)(1),
(2), (4) Date: Jan. 6, 2011

(87) PCT Pub. No.: WO2010/052063
PCT Pub. Date: May 14, 2010

(65) Prior Publication Data
US 2011/0103912 A1 May 5, 2011

(30) Foreign Application Priority Data

Nov. 5, 2008 (DE) .................. 10 2008 055 971

(51) Int. Cl.
*B23Q 1/00* (2006.01)
*B23Q 3/12* (2006.01)
(Continued)

(52) U.S. Cl.
CPC ............ *B23Q 1/0009* (2013.01); *B23Q 3/12* (2013.01); *B23K 26/0093* (2013.01);
(Continued)

(58) Field of Classification Search
CPC .......... Y10T 409/309352; Y10T 409/309296; Y10T 409/30448; Y10T 483/17; Y10T 29/50
USPC ............... 409/231, 230, 144; 483/16; 29/560
See application file for complete search history.

(56) References Cited

U.S. PATENT DOCUMENTS 4,761,101 A * 8/1988 Zettl .............................. 408/6
5,109,223 A * 4/1992 Schmitt et al. ........... 340/870.31
(Continued)

FOREIGN PATENT DOCUMENTS

DE        199 16 710 A1   10/2000
DE   10 2004 024 170 A1   12/2005
(Continued)

OTHER PUBLICATIONS
Written Opinion Form PCT/ISA/237 dated Jan. 22, 2010 (6 pages).
(Continued)

*Primary Examiner* — Erica E Cadugan
(74) *Attorney, Agent, or Firm* — Flynn, Thiel, Boutell & Tanis, P.C.

(57) ABSTRACT

The invention relates to a machining center for work piece machining. The machining center comprises a machine frame, a machine spindle driven by a motor and rotatably arranged on the machine frame, and a group of machine tools that can be exchanged on the machine spindle. The machine tools comprise a coupling shaft that is compatible with a holder of the machine spindle. Furthermore, a rotary transmitter for electric energy is provided, having a stator fixed to the machine in a stationary manner and a rotor rotating along with the machine spindle. It is claimed as novel that the rotary transmitter comprises at least two transmission paths for electric energy which can be selected according to the electric power to be transmitted and the rotational speed of the spindle to be set and which can be activated in the coupled state of the machine tool. At least one first transmission path between the stator and rotor is designed in a non-contact way, while at least one second transmission path between the stator and rotor is provided with contacting contacts. With said measures, complete machining of the workpieces can be made possible when clamped in the machining center.

20 Claims, 10 Drawing Sheets

(51) Int. Cl.
 *B23Q 11/10* (2006.01)
 *B23K 26/00* (2014.01)
 *B23Q 37/00* (2006.01)

(52) U.S. Cl.
 CPC .......... *B23Q 11/1015* (2013.01); *B23Q 37/002* (2013.01); *Y10T 409/303752* (2015.01); *Y10T 409/303976* (2015.01); *Y10T 409/309352* (2015.01)

(56) References Cited

U.S. PATENT DOCUMENTS

| | | | |
|---|---|---|---|
| 5,508,490 A * | 4/1996 | Klose | 219/121.62 |
| 5,791,836 A | 8/1998 | Feufel | |
| 6,474,914 B1 | 11/2002 | Lang | |
| 8,044,822 B2 * | 10/2011 | Hoerl et al. | 340/870.31 |
| 9,004,831 B2 * | 4/2015 | Bierl et al. | 409/231 |
| 2005/0172506 A1 | 8/2005 | Collingwood et al. | |
| 2008/0164045 A1 | 7/2008 | Collingwood et al. | |
| 2011/0299953 A1 * | 12/2011 | Bierl et al. | 409/232 |
| 2013/0322889 A1 * | 12/2013 | Graf | 398/141 |
| 2014/0295755 A1 * | 10/2014 | Graf | 455/41.1 |

FOREIGN PATENT DOCUMENTS

| | | | |
|---|---|---|---|
| EP | 0 719 199 A1 | | 7/1996 |
| SU | 1403113 A1 | | 6/1988 |
| WO | WO 03/089188 A1 | | 10/2003 |
| WO | WO-2006/100451 A1 | * | 9/2006 |
| WO | WO-2010/091821 A1 | * | 8/2010 |

OTHER PUBLICATIONS

Notification of Transmittal of International Search Report Form PCT/ISA/220 dated Jan. 22, 2010 (3 pages).
International Search Report Form PCT/ISA/210 dated Jan. 22, 2010 (3 pages).
Search Report of German Patent Office dated Aug. 24, 2009 (4 pages) with English translation of p. 2.

* cited by examiner

TOOL HAVING AN ACTUATOR FOR BLADE ADJUSTMENT, IT BEING POSSIBLE FOR ELECTRIC CURRENT TO BE APPLIED TO THE ACTUATOR VIA A CONTACT-FREE TRANSMISSION PATH

Fig.10

TOOL HAVING AN APPARATUS FOR WELDING, IT BEING POSSIBLE FOR ELECTRIC CURRENT TO BE APPLIED TO THE APPARATUS VIA A CONTACTING TRANSMISSION PATH

Fig.11

TOOL HAVING AN APPARATUS FOR SOLDERING, IT BEING POSSIBLE FOR ELECTRIC CURRENT TO BE APPLIED TO THE APPARATUS VIA A CONTACTING TRANSMISSION PATH

Fig.12

TOOL HAVING MECHANICAL OR ELECTRICAL STORAGE DEVICE, IT BEING POSSIBLE FOR ELECTRIC CURRENT TO BE APPLIED TO THE STORAGE DEVICE VIA A CONTACTING TRANSMISSION PATH AND FOR THE STORAGE DEVICE TO BE CHARGED IN THE PROCESS AND FOR THE STORAGE DEVICE TO BE DISCHARGED IN A PROGRAM-CONTROLLED MANNER BY EXECUTING A MACHINING PROCESS

Fig.13

ROTARY TRANSMITTER HAVING A FURTHER TRANSMISSION PATH FOR DATA TRANSMISSION IN THE FORM OF AN INDUCTIVE OR CAPACITIVE COUPLING PATH, A RADIO TRANSMISSION PATH OR AN OPTICAL TRANSMISSION PATH

Fig.14

MACHINE SPINDLE HAVING, AT ITS REAR END, A ROTARY PASSAGE FOR A FLUID, IN PARTICULAR FOR COOLING LUBRICANT, WHICH ROTARY PASSAGE HAS A TRANSMISSION PATH ROUTED THERETHROUGH

Fig.15

MACHINING CENTER HAVING ROTARY TRANSMITTER FOR ELECTRIC ENERGY

The invention relates to a machining center having a machine frame, having a motor-driven machine spindle which is arranged in a rotatable manner on the machine frame and accommodates a receptacle for a tool, having a group of machine tools which can be replaced on the machine spindle and which have a coupling element which is compatible with the receptacle of the machine spindle, and having a rotary transmitter for electrical energy, which rotary transmitter has a stator, which is fixed to the machine frame, and a rotor which rotates together with the machine spindle.

Machining centers of this kind are used for a variety of manufacturing tasks. Cutting machining of metal materials, plastics or wood is usually performed in said machining centers using the various replaceable tools. For cuboidal workpieces, it is possible to perform machining which is similar to a rotary machine using a rotary spindle which, on account of the machine kinematics, permits at least three additional translatory degrees of freedom between the workpiece and the tool. Facing heads, for example, are also used for this purpose. Facing heads are rotatable tools which allow a blade to be displaced radially in relation to the rotation axis of the spindle. This is implemented, for example, in machining centers by special components, for example spindles with two-stage planetary gears and an additional external drive which allows the drive shaft for the facing slide to be adjusted when the spindle is rotating. To this end, an electrical transmission interface, which allows the tool to be changed and has a rotary transmitter, is integrated in customary spindle and tool interfaces without adversely affecting the functionality of the mechanism. In principle, the transmission interface in the form of an electrical rotary transmitter can be arranged at the tool-side end or at the rear end of the spindle. In this case, energy can be transmitted in a contact-free fashion by suitable design of the stator and the rotor. One disadvantage of contact-free energy transmission is the limited electrical power. This is particularly applicable in the case of a segment-like stator being used (EP-0 719 199 B1). With customary tool diameters, the amount of electrical power which can be transmitted is limited to approximately 100 watts in such a case. Although this power is sufficient to operate tools with mechanical actuators for blade adjustment and for controlling and regulating said tools, even at the high spindle rotation speeds of the order of magnitude of 10 000 revolutions per minute as are customary at the present time, the manufacture of workpieces requires, in addition to cutting machining, further working steps which, to date, have had to be performed in other special machines outside the machining center. Said working steps include, inter alia, the machining processes of cleaning, welding, hardening, coating and labeling. In addition to the great amount of time spent moving the workpieces from the machining center, temporarily storing them, and positioning them in other special machines, this often requires a supply of energy which can be several times higher than that required for adjusting the workpiece in the actuatory tool of the machining center.

Proceeding from the above, the invention is based on the problem of improving the machining center of the type indicated in the introductory part to the effect that a significant step in the direction of complete machining of a workpiece can be taken with said machining center.

The features of the present invention are proposed for the purpose of solving said problem. Advantageous refinements and developments of the invention are also disclosed.

The solution according to the invention is based on the finding that, for the purpose of complete machining of a workpiece, auxiliary assemblies which can be integrated in a holder which can be replaced by the handling system of a machining center in the form of a cutting-machining tool in the receptacle of the machine spindle are required in addition to the tools for cutting machining. A further finding is that at least some of these auxiliary assemblies require a supply of electrical energy which is several times higher than that required for cutting machining using actuatory tools. A third finding is, finally, that the auxiliary assemblies manage at considerably lower rotation speeds than cutting-machining tools. Therefore, if contact-free rotary transmission of the electrical energy is required for operating the actuatory cutting tools on account of the high operating speeds, rotary transmission with contacting contacts, for example with wiping contacts, can be considered at the lower rotation speeds which are sufficient for the use of the auxiliary assemblies with a high power requirement. Accordingly, the invention proposes that the rotary transmitter has at least two transmission paths for electrical energy which can be selected in accordance with the electrical power to be transmitted and the spindle rotation speed to be set and can be activated when the machine tool is in the coupled-in state, of which at least a first transmission path between the stator and the rotor is formed in a contact-free fashion, while at least a second transmission path between the stator and the rotor is equipped with at least one contacting contact. The contacting contact is preferably in the form of a wiping contact in this case.

A preferred refinement of the invention makes provision for the stator, which is fixed to the machine frame, to have in each case at least one primary side of the transmission path for contact-free and for contacting coupling to a rotor which rotates together with the machine spindle, and for the rotors of a first subgroup of tools to have a secondary side for contact-free coupling to the complementary primary side, the rotors of a second subgroup of tools to have a secondary side for contacting coupling to the complementary primary side and/or the rotors of a third subgroup of tools to have a respective secondary side for contact-free and for contacting coupling to the complementary primary sides of the associated transmission paths.

The rotary transmitter advantageously has a contact-free inductive or capacitive transmission path with sides that are preferably separated from one another by an axial air gap. It is also advantageous for the rotary transmitter to have an electrically conductive transmission path with at least one wiping contact which bridges a radial or an axial air gap. The at least one wiping contact is advantageously supported by a spring in its coupling state. According to a preferred refinement of the invention, the at least one wiping contact is supported by a spring against its centrifugal force which is established when the machine spindle is rotating, with the rotor-side wiping contact lifting off from its stator-side mating contact when a predefined rotation speed is exceeded. It is possible, in principle, for the at least one wiping contact to be coupled or decoupled in a program-controlled fashion via a control device. In this case, control can be performed, for example, using mechanical or electromagnetic means or by means of compressed air.

One special feature of the invention is that the rotation speed of the machine spindle is limited in accordance with the selected contact-free or contacting energy transmission path.

A further advantageous refinement of the invention makes provision for a first subgroup of tools to have an actuator for blade adjustment, and also a secondary side for the contact-free transmission path. A second or third subgroup of tools is advantageously provided, said second or third subgroup of tools having an apparatus for welding, soldering, heating, hardening, soldering, coating, cleaning and/or labeling a workpiece, and also a secondary side for a contacting transmission path. The tools of the second or third subgroup expediently have a laser, an inductor and/or a spray device for a quenching means, such as cooling liquid or cooling air. The quenching means used may be, for example, the cooling lubricant available in a machining center in any case.

A further advantageous refinement of the invention makes provision for the rotary transmitter to have a further transmission path for data transmission. The transmission path for data transmission can be in the form of an inductive or capacitive contact-free coupling path, a radio transmission path or an optical transmission path.

The contact-free and/or the contacting transmission paths or path are/is advantageously arranged at the tool-side end of the spindle. In principle, it is also possible to arrange the contacting and/or the contact-free transmission paths or path of the rotary transmitter at the rear spindle end, with the secondary sides of the transmission paths in question being connected to receptacle-side end contacts of the machine spindle and the tool being electrically connected to the receptacle-side end contacts via co-rotating contact points in the coupled state. In this case, it is possible, in principle, for the machine spindle to have, at its rear end, a rotary passage for a fluid, in particular for cooling lubricant, and for the contacting transmission path to be routed through the rotary passage for the fluid.

The invention also relates to a method for operating a machining center having a rotary transmitter for electrical energy. The rotary transmitter has at least a first and a second transmission path for electrical energy, which transmission paths can be selected in accordance with the electrical power to be transmitted and the spindle rotation speed to be set and can be activated when the machine tool is in the coupled-in state, with, according to the invention, a spindle rotation speed or a spindle rotation speed range being set and the first transmission path or the second transmission path or the first and the second transmission paths being activated as a function of the spindle rotation speed or spindle rotation speed range setting. The electrical energy is advantageously transmitted in a contact-free fashion via the first transmission path and in a contacting fashion via the second transmission path.

The invention will be explained in greater detail below with reference to the exemplary embodiments illustrated schematically in the drawing, in which.

The machine spindles 10 illustrated in the drawing are constituent parts of a machining center for complete machining, which machining center additionally has a tool magazine (not illustrated in the drawing) and a handling apparatus for the machine tools. The machine spindle 10 is arranged within the machining center in a frame which is schematically indicated in the drawings and is identified by reference symbol 12. At its end face, the machine spindle 10 has a receptacle 14 which is intended for clamping a coupling element in the form of a coupling shaft 16 of a machine tool 18 which is taken from the magazine. Said coupling element is clamped in by means of a clamping mechanism which can be operated from the machine side via a tie rod and engages from the machine side into the cavity 20 (shown in FIG. 7a for example) in the tool shaft 16 and couples the machine tool 18 to the machine spindle 16 such that face clamping and radial clamping are established.

One special feature of the invention is that the machine tool 18 contains an electrical load, for example in the form of an actuator for blade adjustment, machining electrics for surface-machining a workpiece, or measurement electronics, which has to be supplied with electric current from outside via the rotary transmitter 22. The rotary transmitter 22 for electrical energy comprises a stator 24, which is fixed to the machine frame, and a rotor 26 which rotates together with the machine spindle.

Figure 1A:
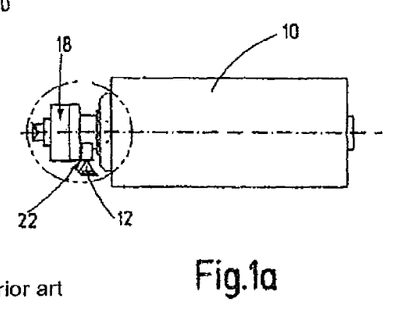
FIGS. 1a and 1b show a side view and an enlarged illustration of a prior-art machine spindle of a machining center with a clamped-in machine tool and contact-free energy transmission in the tool-side region of the machine spindle.
Figure 1B:
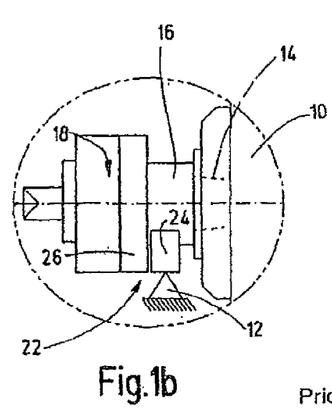

FIGS. 1a and b illustrate an electrical rotary transmitter according to the known prior art (EP-0 719 199 B1), in which the electrical energy is transmitted in a contact-free fashion from a segment-like stator 24, which is fixed to the machine frame, to a rotor 26 which is connected to the machine tool 18. The primary and secondary coils which are required for inductive energy transmission are arranged in the stator and, respectively, rotor. The inductive rotary transmitter can additionally also be used to transmit data. To this end, the data signals can be either modulated onto the AC current for the energy transmission or transmitted on a separate data path via additional data windings.

Figure 2A:
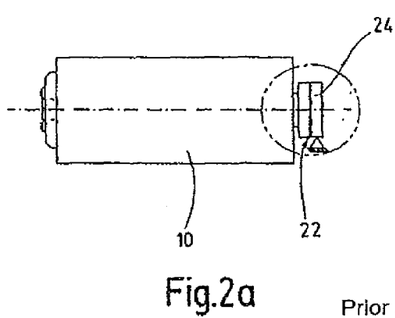
FIGS. 2a and b show a side view and an enlarged illustration of a further prior-art machine spindle of a machining center with a rear contact-free rotary transmitter.
Figure 2B:
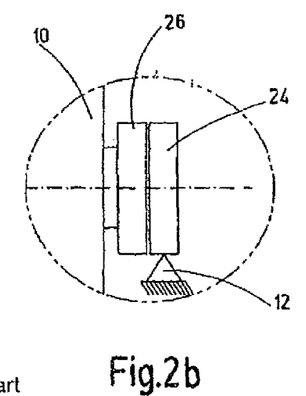

A further arrangement which is known from the known prior art is shown in FIGS. 2a and b. In said arrangement, the rotary transmitter for contact-free energy transmission is located at the rear end of the machine spindle 10 in the form of a revolving rotor 26 and a stator 24 which is arranged fixed to the frame. The electrical energy to be transmitted from the rotor to the machine tool is conducted through the machine spindle 10 via electrical conductors and coupled into the machine tool 18 at a co-rotating electrical contact point (cf. FIGS. 7a and b).

Contact-free energy transmission is performed primarily for operating actuatory tools for cutting machining. In that case, for example, an actuator for blade adjustment is provided, the power consumption of said actuator being of the order of magnitude of 50 watts. If an ultrasound-assisted cutting machining is additionally provided, power consumption of the order to magnitude of 70 to 100 watts results. Above this order of magnitude, contact-free energy transmission is possible at the customary tool sizes only with considerable extra expenditure. However, when machining workpieces, some applications require a great deal more electrical power. These applications include, inter alia, machining processes which require the workpiece or additional media to be heated to higher temperatures and which it has not been possible to perform in machining centers to date, for example cleaning, welding, soldering, hardening, coating and labeling of a workpiece, for which electrical power of the order of magnitude of a few hundred kilowatts is required. A further process which requires more electrical energy is the storage of electrical or mechanical energy in the machine tool, it being possible to discharge this energy in a program-controlled fashion at a later time during operation of the tool. The charging process is expediently performed via a contacting transmission path in this case too.

One special feature of the present invention, then, is that of developing a rotary transmitter which can transmit higher electrical powers if required. Since the higher electrical power is usually associated with a lower requisite rotation speed of the machine spindle, one significant idea of the present invention is that of a contacting, that is to say contact-forming, transmission path to be provided in addition to the described contact-free transmission path for energy transmission, said contacting transmission path allowing only relatively low rotation speeds of the machine spindle of up to an order of magnitude of 1000 revolutions per minute but being suitable for transmitting electrical powers which are very much higher.

Figures 3A, 3B, 3C:
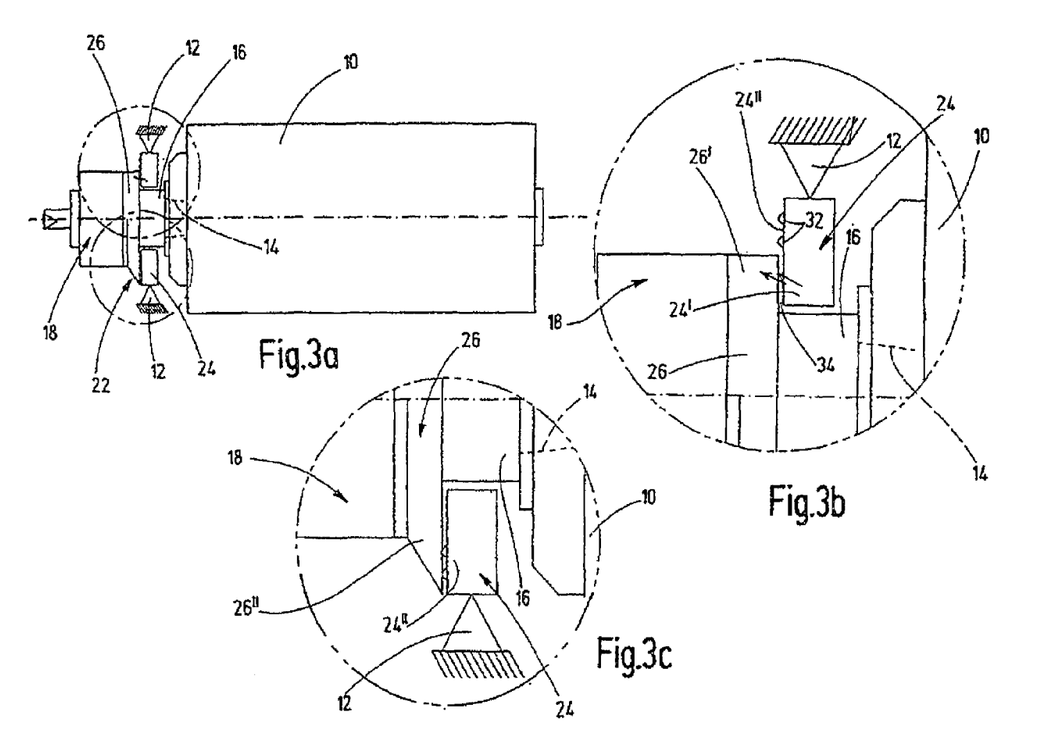
FIGS. 3a to c show a side view and two enlarged illustrations of a detail of a machine spindle of a machining center with a clamped-in machine tool and a tool-side combined rotary transmitter for contact-free and contacting energy transmission.

In the exemplary embodiment shown in FIGS. 3a to c, a stator 24, which is fixed to the frame, is provided on the tool side of the machine spindle 10, said stator having the primary side 24' of a contact-free transmission path in its radially inner region and the primary side 24" of a contacting transmission section with contact elements 32 in its radially outer region. Depending on the requirement for electrical power, the machine tool 18 is equipped with a rotor 26, the secondary side 26' of said rotor overlapping only the inner primary side 24' for contact-free energy transmission (FIG. 3b), or the secondary side 26" of said rotor also overlapping the outer primary side 24" of the stator 24 which has the wiping contacts 32 (FIG. 3c). In the former case according to FIG. 3b, the machine spindle 10 can be driven at higher rotation speeds but with lower power transmission, while in the latter case the spindle rotation speeds are automatically reduced but higher electrical powers can be transmitted. The rotation speeds and the electrical power are limited in a program-controlled manner in accordance with the machine tool selected by means of the tool changer of the machining center.

Figure 4A:
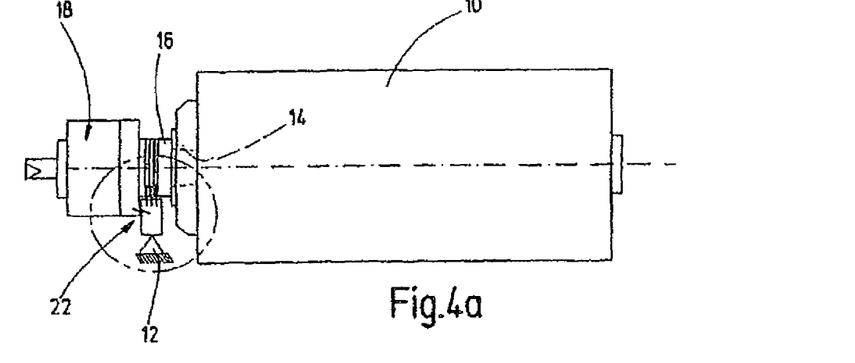
FIGS. 4a and b show a side view and an enlarged illustration of a detail of a machine spindle of a machining center with a clamped-in machine tool and a combined rotary transmitter, which is modified in relation to FIGS. 3a to c, for contact-free and contacting energy transmission.
Figure 4B:
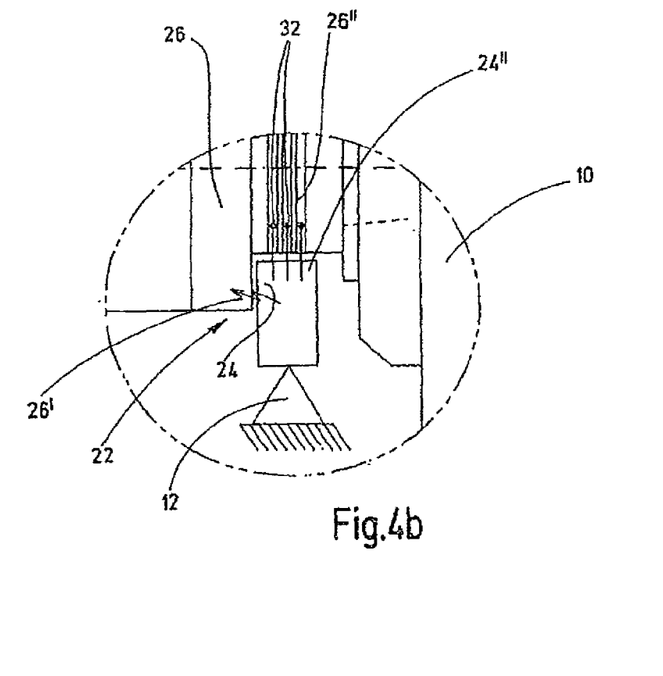

The exemplary embodiment according to FIGS. 4a and b differs from the exemplary embodiment according to FIGS. 3a to c in that the contacting electrical transmission path is oriented radially and not axially. In the case of FIGS. 4a and b, the stator 24 has electrical wiping contacts 32 which can be moved radially into their operating position (shown in FIG. 4b) only after the machine tool 18 has been replaced. In addition to the contacting transmission path 24" with the wiping contact 32, a contact-free, preferably inductive, transmission path is also provided in FIG. 4b, it being possible for said contact-free transmission path to be operated at the same time as the contacting transmission path, as in the case of FIGS. 3a to c. In this exemplary embodiment, the machine control system ensures that the wiping contacts 32 are decoupled at high spindle rotation speeds. Unnecessary wear or even destruction of the wiping contacts 32 is avoided as a result.

Figure 5A:
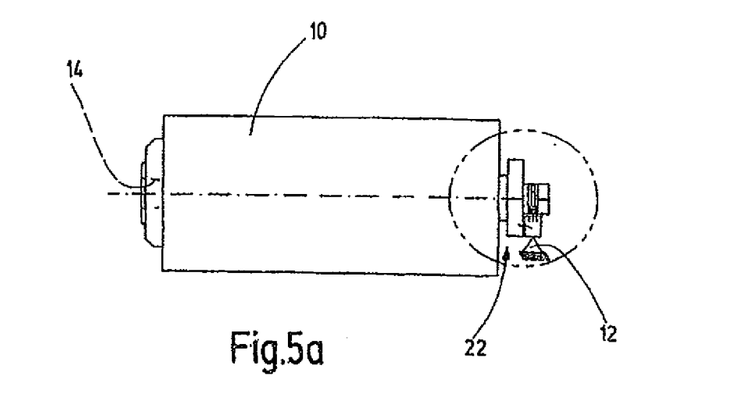
FIGS. 5a and b show a side view and an enlarged illustration of a detail of a machine spindle of a machining center with a rear combined rotary transmitter for contact-free and contacting energy transmission.
Figure 5B:
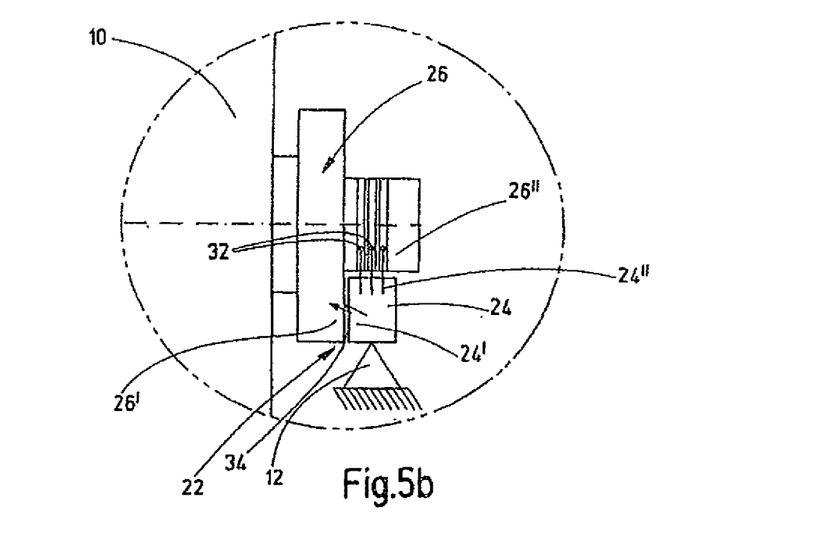

The exemplary embodiment according to FIGS. 5a and b differs from the exemplary embodiment according to FIGS. 4a and b in that the combined rotary transmitter 22 with its contact-free and contacting transmission paths is located at the rear end of the machine spindle 10. The rotor 26 is connected to the machine spindle 10 in a rotationally fixed manner there, while the combined stator 24 is connected to the frame 12. The design of the contact-free and contacting transmission paths corresponds to the exemplary embodiment according to FIGS. 4a and b.

Figure 6A:
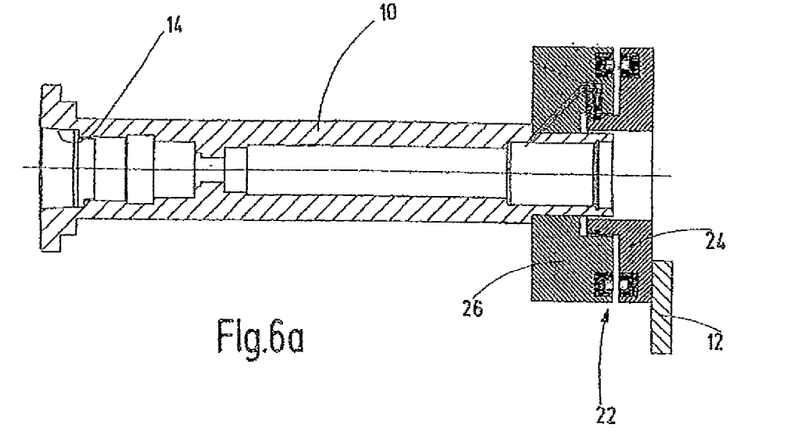
FIGS. 6a to c show a longitudinally sectioned illustration and two enlarged illustrations of a detail of a machine spindle of a machining center with a rear combined rotary transmitter, which is modified in relation to FIGS. 5a and b, for contact-free and contacting energy transmission.
Figures 6B, 6C:
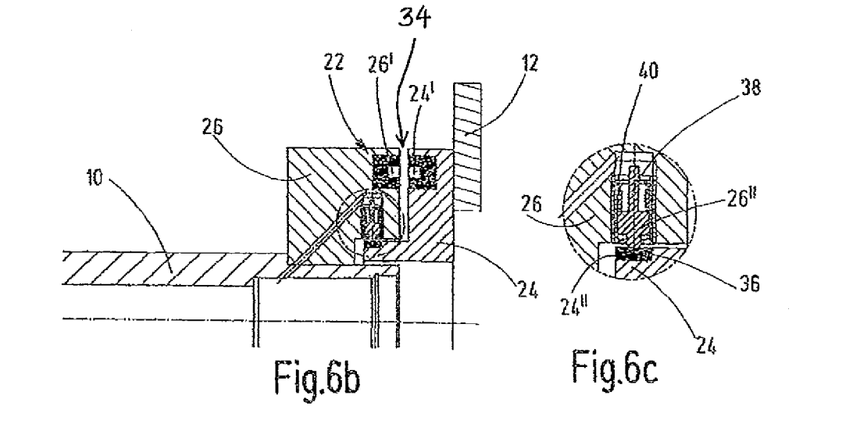

A refinement of a combined rotary transmitter which is modified in comparison to the above is illustrated in FIGS. 6a to c. In said refinement, the stator 24 is also rigidly connected to the frame 12, while the revolving rotor 26 is arranged at the rear end of the machine spindle 10. For the contact-free transmission path, the primary side 24' of the stator 24 and the secondary side 26' of the rotor 26 are separated from one another by means of an axial air gap 34. The contacting transmission path has a circumferential contact ring 36 on the primary side 24", while the rotor side 26" has a contact pin 38 which is arranged in the rotor 26 and is pushed radially against the primary-side contact ring 36 under the action of a compression spring 40. When the machine spindle 10 is rotating, the contact pin 38 is acted on by centrifugal force which ensures that the contact pin 38 is lifted off from the contact ring 36 against the action of the compression spring 40 and the transmission of power is interrupted when a defined rotation speed is reached. This ensures that the wiping contacts are not impermissibly subject to wear at excessively high machine rotation speeds.

Figure 7A:
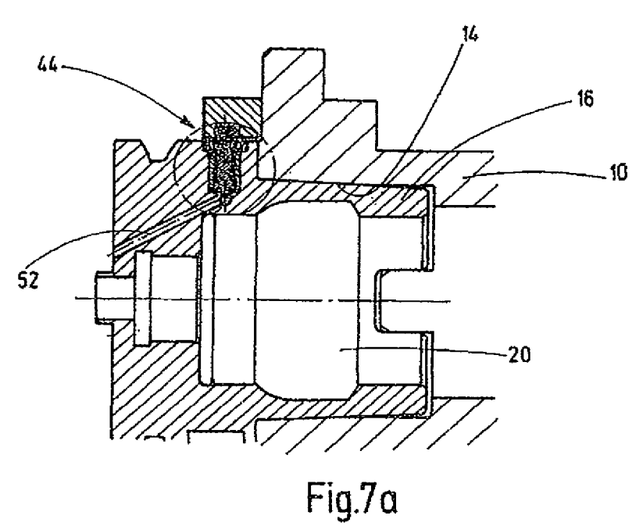
FIGS. 7a and b show a detail of a machine spindle with a clamped-in machine tool and an operable contact point with a slipring.
Figure 7B:
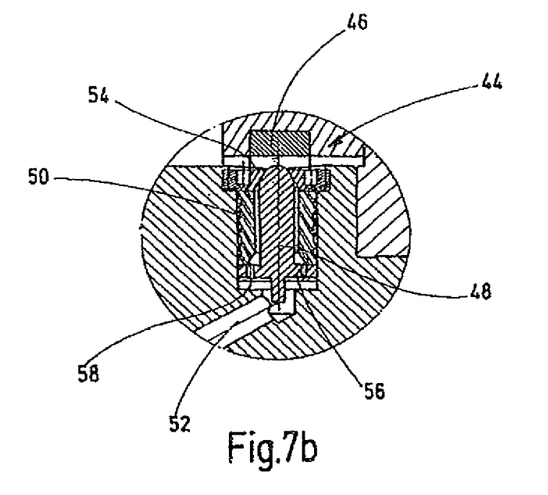

One special feature of the variants according to FIGS. 5a and b and also 6a and b is that, in addition to the rotary transmitter 22 at the rear end of the machine spindle 10, an electrical replacement contact with the machine tool has to be established at the end face of said machine spindle. The contact point 44 which is shown in FIGS. 7a and b serves this purpose, said contact point rotating together with the machine spindle 10 and having a contact area 46, which is connected in a rotationally fixed manner to the machine spindle 10 and is connected to the rear secondary sides of the rotary transmitter 22, and also having a contact pin 48 which is arranged on the tool shaft 16 and can be displaced radially in relation to said tool shaft. In order to be able to insert the tool shaft 16 into the tool receptacle 14, the contact pin 48 is initially located in its retracted position which is shown in FIGS. 7a and b. In order to establish electrical contact, the contact pin 48 is displaced in the direction of the contact area 46 against the force of the restoring spring 50 either under the action of centrifugal force when the spindle 10 is rotating or under the action of a pressure means which is supplied via the line 52. In the end-face region, the contact pin 48 passes through a rubber seal 54 which ensures that no dirt can enter the interior of the pin guide from the outside. In addition, openings 58 are provided in a rear, bulb-like region 56 of the contact pin 48, it being possible for purging air to be forced in via said openings for cleaning the contact point. The contact pin can, in principle, be moved forward electrically, electromagnetically or mechanically, it being possible for the drive means provided for this purpose to be operated in a program-controlled fashion.

Figure 8A:
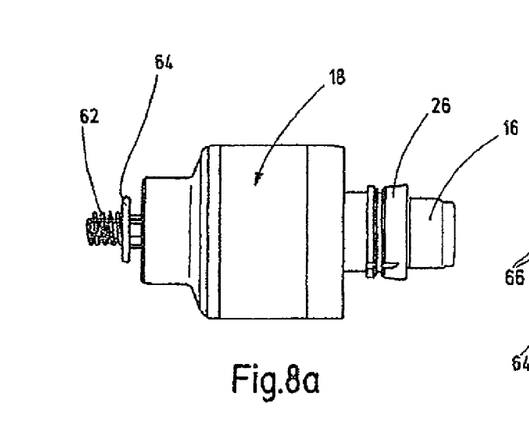
FIGS. 8a and b show a side view and a plan view of a tool head with an inductive hardening apparatus.
Figure 8B:
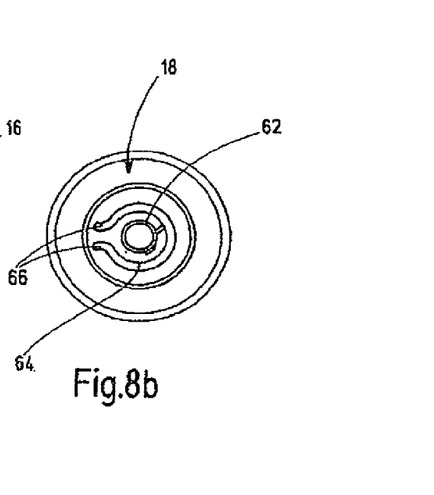

FIGS. 8a and b show a side view and a plan view of a machine tool 18 which is equipped with an inductive hardening apparatus. Hardening of certain workpiece parts forms a manufacturing step on the way to complete machining. To this end, the tool 18 shown in FIGS. 8a and b has an induction coil and also a fluid line 64 with spray nozzles 66 for a quenching means. The induction coil 62, which is intended for partially heating the portion of a tool which is to be hardened, has a power requirement of the order of magnitude of a few hundred watts depending on its size. In addition, an electrically or electromagnetically operable valve (not illustrated) is arranged in the fluid line, it likewise being necessary to supply electric current to said valve. The power requirement there is so high that contact-free current transmission would not suffice.

Figure 9A:
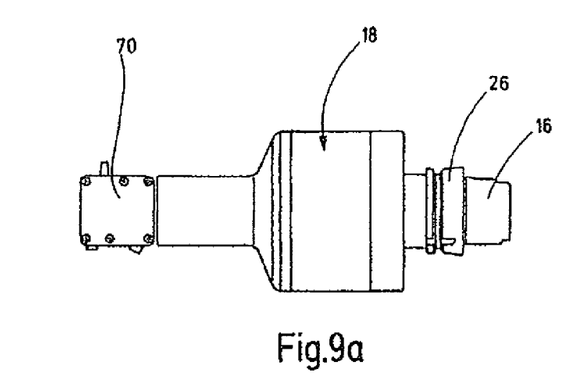
FIGS. 9a and b show a side view and a plan view of a measurement head with a laser-optic measurement sensor.
Figure 9B:
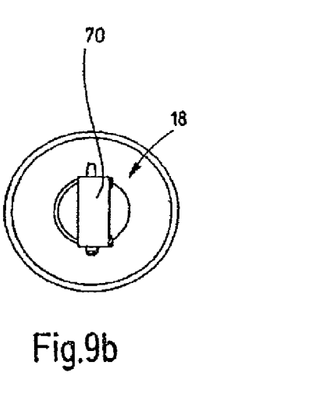
Figure 10:
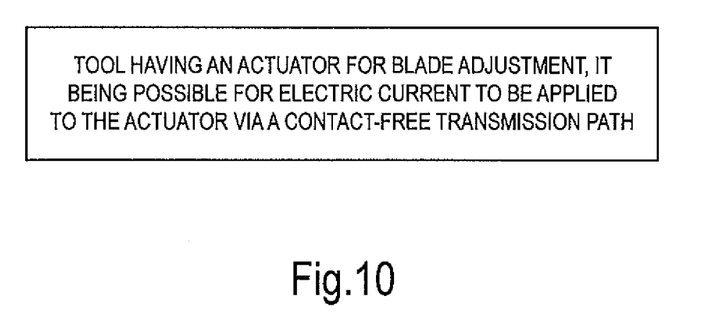
FIG. 10 schematically shows an embodiment of a tool having an actuator for blade adjustment.
Figure 11:
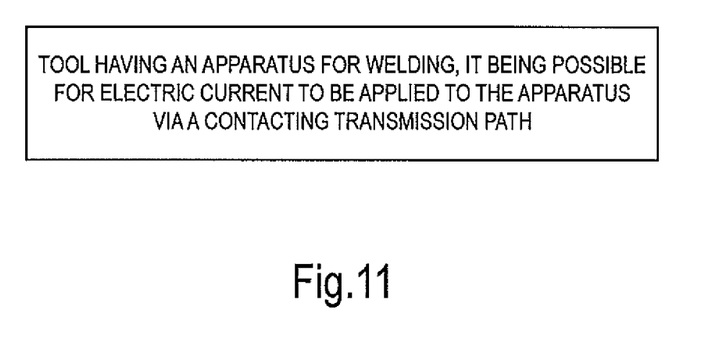
FIG. 11 schematically shows an embodiment of a tool for welding.
Figure 12:
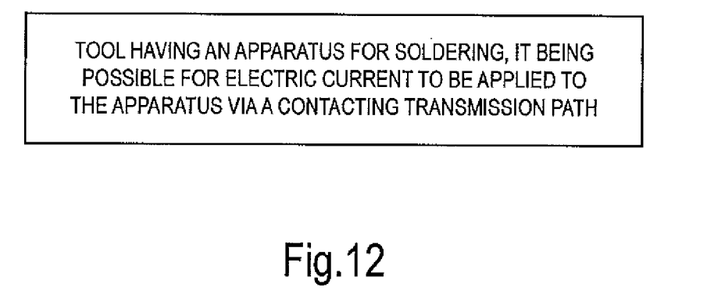
FIG. 12 schematically shows an embodiment of a tool for soldering.
Figure 13:
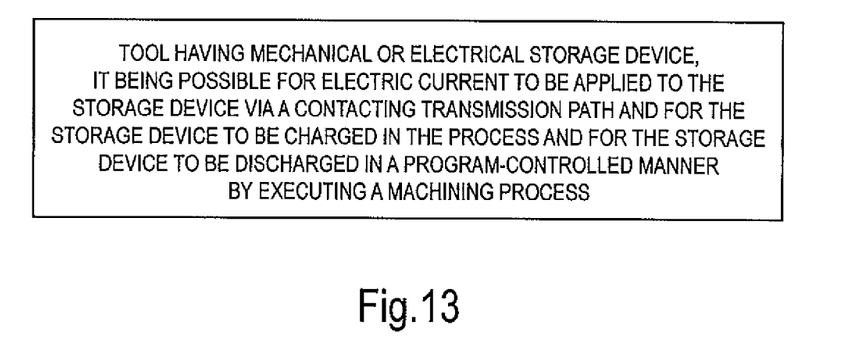
FIG. 13 schematically shows an embodiment of a tool having a mechanical or electrical storage device.
Figure 14:
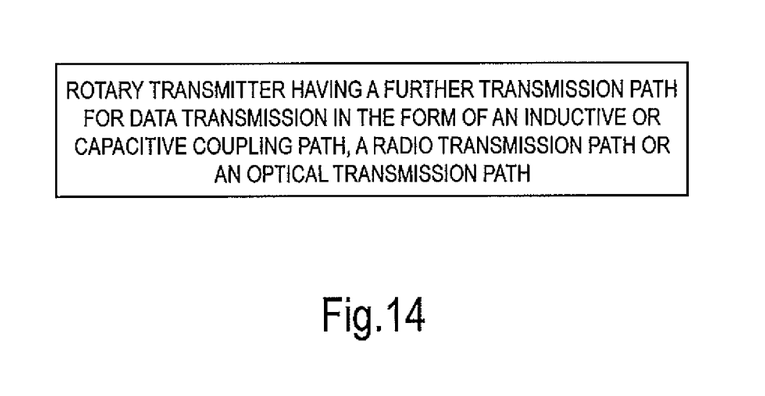
FIG. 14 schematically shows a rotary transmitter having a further transmission path for data transmission.
Figure 15:
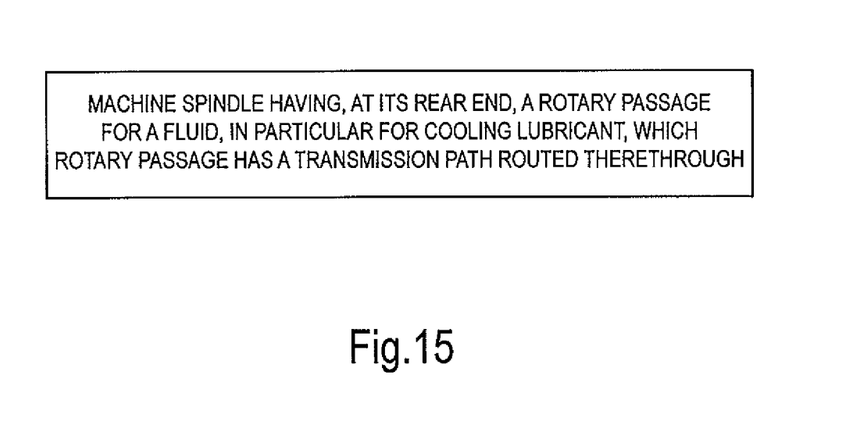
FIG. 15 schematically shows the machine spindle with a passage for fluid.

The machine tool 18 according to FIGS. 9a and b is equipped with an optical laser 70 for measuring the machined workpiece or for locally heating or labeling said workpiece. Electrically conductive current transmission via the rotary transmitter 22 is also required for this purpose, depending on the power requirement.

In summary, the following can be stated: the invention relates to a machining center for machining workpieces. The machining center has a machine frame 12, a motor-driven machine spindle 10 which is arranged in a rotatable manner on the machine frame 12, and also a group of machine tools 18 which can be replaced on the machine spindle. The machine tools, for their part, have a coupling shaft 16 which is compatible with a receptacle 14 of the machine spindle 10. Furthermore, a rotary transmitter 22 for electrical energy is provided which has a stator 24, which is fixed to the machine, and a rotor 26 which rotates together with the machine spindle 10. The novel features claimed are that the rotary transmitter 22 has at least two transmission paths for electrical energy which can be selected in accordance with the electrical power to be transmitted and the spindle rotation speed to be set and can be activated when the machine tool 18 is in the coupled-in state, of which at least a first transmission path between the stator 24 and the rotor 26 is formed in a contact-free fashion, while at least a second transmission path between the stator and the rotor is equipped with contacting contacts. The result intended to be achieved by virtue of these measures is that of it being possible to completely machine the workpieces while they are clamped in the machining center.

The invention claimed is:

1. A machining center comprising:
a machine frame;
a motor-driven machine spindle which is arranged in a rotatable manner on the machine frame for rotation about an axis;
a group of machine tools which can be replaced on the machine spindle and each tool of which has a respective coupling element which is compatible with a receptacle of the machine spindle; and
a rotary transmitter for transmitting electrical energy, which rotary transmitter has a stator, which is fixed to the machine frame, and a rotor which rotates together with the machine spindle;
wherein the rotary transmitter has at least two transmission paths for electrical energy which can be selected in accordance with the amount of electrical power to be transmitted and the spindle rotation speed to be set and can be activated when one of the machine tools is in a coupled-in state with the respective coupling thereof coupled in the receptacle of the machine spindle, of which paths at least a first transmission path between the stator and the rotor is formed in a contact-free fashion, while at least a second transmission path between the stator and the rotor is equipped with at least one contacting contact, and wherein the machining center is configured to operate in a program-controlled manner such that electrical power is transmitted through only one of the first and second transmission paths at a time in dependence on the amount of electrical power to be transmitted and the spindle rotation speed to be set.

2. The machining center as claimed in claim 1, wherein the stator includes, for each of the first and second transmission paths, a primary side, for contact-free coupling and for contacting coupling to the rotor, and the rotor has: a secondary side for contact-free coupling to the primary side of the stator; a secondary side for contacting coupling to the primary side of the stator; or a secondary side for both contact-free coupling and for contacting coupling to the primary side of the stator.

3. The machining center as claimed in claim 1, wherein the first transmission path of the rotary transmitter is a contact-free inductive transmission path.

4. The machining center as claimed in claim 3, wherein primary and secondary sides of the contact-free transmission path are separated from one another by an axial air gap.

5. The machining center as claimed in claim 1, wherein the first transmission path of the rotary transmitter is a contact-free capacitive transmission path.

6. The machining center as claimed in claim 1, wherein the second transmission path of the rotary transmitter is an electrically conductive transmission path with at least one wiping contact which bridges a radial air gap.

7. The machining center as claimed in claim 6, wherein the at least one wiping contact is acted on by a spring in a coupling state.

8. The machining center as claimed in claim 6, wherein the at least one wiping contact is supported by a spring against centrifugal force which is established when the spindle is rotating, and wherein the at least one wiping contact lifts off from a mating contact when a predefined rotation speed is exceeded.

9. The machining center as claimed in claim 1, wherein the second transmission path of the rotary transmitter is an electrically conductive transmission path with at least one wiping contact which bridges an axial air gap.

10. The machining center as claimed in claim 1, wherein the at least one contacting contact includes at least one wiping contact that can be coupled and/or decoupled in a program-controlled fashion.

11. The machining center as claimed in claim 1, wherein the rotation speed of the machine spindle is limited in accordance with the selected first or second transmission path.

12. The machining center as claimed in claim 1, wherein a subgroup of machine tools has an actuator for blade adjustment, it being possible for electric current to be applied to said actuator via the first transmission path.

13. The machining center as claimed in claim 1, wherein a subgroup of machine tools has an apparatus for welding a workpiece, an apparatus for soldering a workpiece, an apparatus for heating a workpiece, an apparatus for hardening a workpiece, an apparatus for coating a workpiece, or an apparatus for labeling a workpiece, it being possible for electric current to be applied to said subgroup via the second transmission path.

14. The machining center as claimed in claim 13, wherein the machine tools of the subgroup have at least one of: a laser; an inductor; and an electrically operable spray assembly for a quenching fluid.

15. The machining center as claimed in claim 1, wherein a subgroup of machine tools has a mechanical or electrical storage device, it being possible for electric current to be applied to said storage device via the second transmission path and for said storage device to be charged and discharged in a program-controlled manner by executing a machining process.

16. The machining center as claimed in claim 1, wherein the rotary transmitter has a further transmission path for data transmission.

17. The machining center as claimed in claim 16, wherein the transmission path for data transmission is in the form of an inductive or capacitive coupling path, a radio transmission path or an optical transmission path.

18. The machining center as claimed in claim 1, wherein the rotary transmitter is arranged at a rear spindle end of the machine spindle opposite from the receptacle, and wherein the machine tool that is coupled to the machine spindle is connected to the at least two transmission paths via a contact point.

19. The machining center as claimed in claim 18, wherein the machine spindle has, at the rear spindle end thereof, a rotary passage for a fluid, and wherein at least one of the at least two transmission paths is routed through the rotary passage for the fluid.

20. A method for operating the machining center according to claim 1, in which method a spindle rotation speed or a spindle rotation speed range is set and the first transmission path or the second transmission path is activated as a function of the spindle rotation speed or spindle rotation speed range setting, wherein the electrical energy is transmitted in a contact-free fashion via the first transmission path and in a contacting fashion via the second transmission path.

\* \* \* \* \*